United States Patent Office 3,557,069
Patented Jan. 19, 1971

3,557,069
PROCESS FOR POLYMERIZING VINYL ESTERS WITH GASEOUS MONOMERS
Ralph H. Bauer, Huntington Beach, Calif., assignor to Union Oil Company of California, Los Angeles, Calif., a corporation of California
No Drawing. Filed Oct. 9, 1968, Ser. No. 766,293
Int. Cl. C08f 1/13, 15/00
U.S. Cl. 260—87.3                           4 Claims

ABSTRACT OF THE DISCLOSURE

Vinyl acetate and ethylene are copolymerized at high pressure and the polymer product in emulsion form is discharged from the reactor under ethylene pressure. Instead of venting the remaining ethylene, it is sealed into the reactor, the ingredients for the next batch are loaded in and a new reaction is initiated. This eliminates the necessity for flushing air from the system.

---

This invention relates to a new and improved process for producing copolymers of vinyl esters and gaseous monomers. More specifically, this invention relates to an improved process for producing vinyl acetate-ethylene copolymers.

These copolymer materials are used as paint bases, for adhesives and as a coating or impregnant in textiles.

The commercial production of vinyl acetate-ethylene copolymers usually takes place in 1000 gallon reactors at pressures ranging from 50–1500 p.s.i.g. and at temperatures ranging from about 75°–165° F. The reactions are carried out in water using surfactants and a free radical or redox catalyst.

The reactions take about 6–8 hours to complete, and hence are essentially of the batch type. Following completion of the reaction, the copolymer product is discharged from the bottom of the reactor where it is cooled and defoamed. At this time, the remaining ethylene is vented from the system and the reactor is cleaned. When a new batch is made up, air must be substantially eliminated from the system since it interferes with the polymerization reaction. This is achieved by flushing the reactor once with nitrogen under pressure followed by a triple flushing with ethylene under pressure. The reactor is finally pressured with ethylene, the ingredients are loaded into the reactor, the polymerization initiated and the reaction maintained till completion.

There are a number of problems associated with this standard technique. For one thing, large quantities of nitrogen and ethylene are consumed in flushing out the reactor and this is expensive and time consuming. Also the residue from the previous reaction is usually cleaned from the reactor. Approximately one hour is required for the cleaning and flushing operation, and in both cases, the time and effort of skilled personnel must be employed.

Another problem is that after the reactants have been added to the reactor, they must be heated to initiate the reaction, and this involves a further delay; since steam heat is required, this necessitates additional expense. Upon completion of the reaction, the copolymer must be cooled and this entails an expenditure for cooling water.

Thus, in summary, present techniques for charging and discharging the reactor are time consuming, require extra heating and cooling, and necessitate the attention of skilled operators.

It is, therefore, an object of the invention to provide a process for producing vinyl ester-gaseous monomer copolymers which significantly reduces the charging and discharging time of the reactors.

Another object is to provide a process for producing vinyl acetate-ethylene copolymers which eliminates the necessity of flushing the reactor with nitrogen and ethylene to remove air.

These and other objects of the invention will become apparent from the description to follow.

According to the invention, after completion of the reaction, all the polymer emulsion and some of the ethylene are discharged from the reactor bottom by the ethylene pressure. After the polymer has been discharged, instead of venting the remaining ethylene, the reactor is closed and the remaining ethylene under pressure and any residue polymer is sealed into the reactor. A fresh charge of ingredients is loaded into the reactor, additional ethylene is pumped in to establish operating pressure, and the reaction is heated to initiation.

The invention is illustrated by the following example:

A 20 gallon empty stainless steel reactor was purged of air by pressuring and flushing once with nitrogen and three times with ethylene. The reactor was then pressured with ethylene to 500 p.s.i. for charging with the following:

FORMULA

| Ingriedients | Lbs. | Grams | Percent |
|---|---|---|---|
| 1. Tap water | 33.10 | | 37.270 |
| 2. Triton X-100 | 5.03 | 2,281.9 | 5.663 |
| 3. Sodium bicarbonate | 0.13 | 60.9 | 0.14 |
| 4. Vinyl acetate | 4.62 | 2,095 | 5.202 |
| 5. Ferrous sulfate heptahydrate | | 0.2 | |
| 6. Sodium bisulfite meta | 0.10 | 46.0 | 0.112 |
| 7. Potassium persulfate | 0.15 | 66.9 | 0.168 |
| 8. Deionized water | 3.96 | 1,795.6 | 4.458 |
| 9. Potassium persulfate | 0.03 | 13.4 | 0.033 |
| 10. Deionized water | 0.79 | 360.0 | 0.889 |
| 11. Vinyl acetate | 40.90 | | 46.053 |

Ingredients 1–6 are charged to the reactor. The temperature is raised to 140° F. and 300 ml. of potassium persulfate in water (7 in 8) is added. The vinyl acetate (11) is added at a rate of 8–10 lbs./15 min. One hour after addition is completed the balance of the potassium persulfate in water (7 in 8) and the vinyl acetate in water (10 in 11) are added. Heating is continued at 160° F. until residual monomer is less than 0.5%.

The reactor is cooled and the polymer emulsion is then discharged to a receiving vessel; following discharge, the ethylene pressure is 150 p.s.i. The reactor is then closed to seal in the remaining ethylene and is then recharged for another reaction. No nitrogen or ethylene flushing is necessary. Five runs were made in this manner and the polymer produced in each run had the following properties:

TABLE I

| Run | Viscosity [a] | Solids | Scrub [b] | Mechanical stability [c] | Film | pH | Free mon., percent | Wt./gal./lb. |
|---|---|---|---|---|---|---|---|---|
| 1 | 360 | 59.4 | >2,500 | Excellent | Clear | 5.1 | 0.85 | 9.1 |
| 2 | 310 | 58.3 | >2,500 | do | do | 5.1 | 0.25 | 9.1 |
| 3 | 280 | 59.7 | >2,500 | do | do | 5.2 | 0.90 | 9.1 |
| 4 | 270 | 59.3 | >2,500 | do | do | 5.4 | 1.20 | 9.1 |
| 5 | 450 | 60.6 | >2,500 | do | do | 5.2 | 1.85 | 9.0 |

[a] Brookfield No. 3 spindle at 20 r.p.m.
[b] Gardner straight line with 1 gram Ajax cleanser.
[c] Fifteen minutes in Waring blender at "high" speed.

Surprisingly, it has also been found that permitting the residue to remain in the reactor does not adversely affect the quality of the polymer in the succeeding batch. Thus the above properties shown in the table exhibit no more run to run variation than if discharging the reactor to atmospheric pressure, cleaning the reactor to remove residue, flushing and repressuring.

In the example, the final ethylene pressure in the reactor following discharge of the emulsion is 150 p.s.i. Final ethylene pressures will, of course, vary depending on the initial ethylene pressure, and the amount of polymer emulsion to be discharged.

In the example, the reactor is cooled prior to discharging the polymer. However, it is more desirable to discharge the finished emulsion, while still hot, into a tank which has a circulation system containing the charge for the next run. This has several advantages. For one thing, because the cooling step has been substantially reduced, less cooling water is required and the reactor down-time is decreased significantly for the discharge cycle. Furthermore, if the finished emulsion is discharged hot, it will dissipate its foam quicker than when in a cooled condition. Also, since the charge for the next run has been preheated, less steam is required for heating the new charge; additionally, the residence time of the new charge in the reactor has been decreased. Thus, down-time of the reactor during the loading cycle is decreased.

The following time saving on reactor down-time for a 20 gallon reactor due to eliminating or reducing the various steps is as follows—Cleaning reactor: 30 minutes; flushing with nitrogen and ethylene: 15 minutes; preheating the charge to reaction temperature: 15 minutes; removing polymer emulsion from the hot reactor rather than cooling: 30 minutes.

The estimated time savings for a 1000 gallon reactor is as follows—Cleaning: 30 minutes; flushing: 30 minutes; preheating: 60 minutes; discharging hot: 60 minutes.

Accordingly, it will be seen that the present process eliminates air contamination and hence nitrogen and ethylene flushing. Finally, the charge and discharge cycle times can be expedited.

I claim:
1. In a batch polymerization process wherein a reactor is charged with an aqueous emulsion polymerization medium and a polymerizable quantity of a vinyl ester for copolymerization therein with a gaseous monomer at a pressure of 50–1500 p.s.i.g. and at a temperature of 75° to 165° F. until substantially all said quantity of said vinyl ester is copolymerized and the resultant polymer emulsion is thereupon discharged from said reactor and subsequently fresh quantities of aqueous medium and vinyl ester are recharged to said reactor in a repeated copolymerization, the improvement which comprises maintaining, in said reactor, a superatmospheric pressure of said gaseous monomer during the steps of discharge of said polymer emulsion and recharging of said aqueous medium and vinyl ester.

2. The process of claim 1 in which the vinyl ester is vinyl acetate and the gaseous monomer is ethylene.

3. The process of claim 2 in which the reaction pressure is about 500 p.s.i.g., the discharge temperature is about 160° F., and the ethylene is maintained at about 150 p.s.i.g. in the reactor during said discharge and recharging steps.

4. The process of claim 2 in which the polymer emulsion is discharged at about reaction temperature into heat exchange relationship with the charge for the succeeding reaction.

References Cited
UNITED STATES PATENTS

| | | | |
|---|---|---|---|
| 2,395,381 | 2/1946 | Squires | 260—87.3 |
| 2,396,791 | 3/1946 | Krase et al. | 260—94 |
| 2,414,311 | 1/1947 | Larson | 260—94 |
| 2,956,995 | 10/1960 | Knight | 260—94.9 |
| 2,989,517 | 1/1961 | Hanson et al. | 260—93.5 |

JAMES A. SEIDLECK, Primary Examiner

J. KIGHT, Assistant Examiner